US008285402B2

(12) United States Patent
Lueckenbach et al.

(10) Patent No.: US 8,285,402 B2
(45) Date of Patent: Oct. 9, 2012

(54) METHOD AND SYSTEM FOR SAFETY MONITORED TERMINAL BLOCK

(75) Inventors: William Henry Lueckenbach, Charlottesville, VA (US); Edwin Thurnau, McGaheysville, VA (US); Marcel Van Helten, Wasserliesch (DE)

(73) Assignee: GE Intelligent Platforms, Inc., Charlottesville, VA (US)

( * ) Notice: Subject to any disclaimer, the term of this patent is extended or adjusted under 35 U.S.C. 154(b) by 208 days.

(21) Appl. No.: 12/172,286

(22) Filed: Jul. 14, 2008

(65) Prior Publication Data

US 2010/0010642 A1    Jan. 14, 2010

(51) Int. Cl.
*G05B 9/02* (2006.01)

(52) U.S. Cl. ................. 700/79; 700/19; 361/1
(58) Field of Classification Search ............... 700/79, 700/80; 200/401; 340/500; 361/1, 23, 52; 307/326
See application file for complete search history.

(56) References Cited

U.S. PATENT DOCUMENTS

| | | | | |
|---|---|---|---|---|
| 5,422,808 A * | 6/1995 | Catanese et al. | ........... | 700/79 |
| 6,647,301 B1 * | 11/2003 | Sederlund et al. | ........... | 700/79 |
| 6,778,079 B2 * | 8/2004 | Weber | ........... | 340/500 |
| 6,778,867 B1 * | 8/2004 | Ziegler et al. | ........... | 700/79 |
| 6,832,121 B1 * | 12/2004 | Albrecht et al. | ........... | 700/79 |
| 7,027,880 B2 * | 4/2006 | Izzo et al. | ........... | 700/21 |
| 7,130,703 B2 * | 10/2006 | Ott et al. | ........... | 700/80 |
| 7,139,622 B2 * | 11/2006 | Klopfer et al. | ........... | 700/79 |
| 7,286,886 B2 * | 10/2007 | Klopfer et al. | ........... | 700/79 |
| 7,287,184 B2 * | 10/2007 | Gibart et al. | ........... | 714/11 |
| 7,330,768 B2 * | 2/2008 | Scott et al. | ........... | 700/79 |
| 7,412,293 B2 * | 8/2008 | Dold et al. | ........... | 700/79 |
| 7,813,813 B2 * | 10/2010 | Muneta et al. | ........... | 700/1 |
| 7,831,317 B2 * | 11/2010 | McGreevy et al. | ........... | 700/19 |
| 8,024,053 B2 * | 9/2011 | Murakami | ........... | 700/79 |
| 2005/0203645 A1 * | 9/2005 | Klopfer et al. | ........... | 700/79 |

OTHER PUBLICATIONS

PCT Search Report issued in connection with corresponding WO Patent Application No. US09/47828 filed on Jun. 18, 2009.

* cited by examiner

*Primary Examiner* — Dave Robertson
(74) *Attorney, Agent, or Firm* — GE Global Patent Operation; Catherine J. Toppin

(57) ABSTRACT

A method, apparatus, and system for controlling a process are provided. The control device apparatus includes an input section configured to receive input signals from a controlled process, a first output section communicatively coupled to the input section wherein the first output section is configured to transmit the received input signals to a controller, and a second output section communicatively coupled to the controller, the second output section is configured to transmit control signals from the controller to the controlled process. The apparatus further includes a safety logic block communicatively coupled to the input section in parallel with the received input signals that are transmitted to the controller, the safety logic block is configured to generate a safety output signal using the received input signals, the safety logic block is further configured to transmit the safety output signal to the controlled process independent of the control signals.

11 Claims, 2 Drawing Sheets

METHOD AND SYSTEM FOR SAFETY MONITORED TERMINAL BLOCK

BACKGROUND OF THE INVENTION

This disclosure relates generally to programmable process controllers and, more particularly, to safety input output devices used with programmable process controllers.

At least some known process controllers include special purpose computers, for example, programmable logic controllers (PLCs) that are used for the control of industrial machines and processes. During execution of a stored control program, the process controller reads inputs from the controlled process and, in accordance with the logic of the control program, provides outputs to the controlled process.

PLC's are normally constructed modularly with a processor and I/O circuitry that are constructed as separate modules that may be inserted in a chassis and connected together through a common backplane. The I/O modules permit connection of the input and output field wiring to the processor through the backplane. The field wiring typically includes multi-conductor cables that extend from the PLC cabinet to a termination panel proximate a machine or process to be controlled. The multi-conductor cable may extend for significant distances and may be broken into several terminated segments as it is routed through a plant.

Some machines and/or processes include safety functions intended to protect operators and/or equipment from injury or damage due to a malfunction or intrusion into a field of operation of the machine. Safety systems, for use in providing such safety functions are generally embodied in a separate qualified safety system or incorporated into the control system by safety qualifying the entire control system.

Such discrete safety systems can be costly to install and maintain, especially for complex control applications and qualifying the entire control system incurs significant expense of initial safety qualification and continued maintenance of the system safety qualification. Additionally, long distances between the controlled process or machine and the process controller, intervening signal conditioning and processing devices, and the scan rate of the process controller may delay the actuation of the safety function due to the response time of the system.

BRIEF DESCRIPTION OF THE INVENTION

In one embodiment, a control device for controlling a process includes an input section configured to receive input signals from a controlled process, a first output section communicatively coupled to the input section wherein the first output section is configured to transmit the received input signals to a controller, and a second output section communicatively coupled to the controller, the second output section is configured to transmit control signals from the controller to the controlled process. The apparatus further includes a safety logic block communicatively coupled to the input section in parallel with the received input signals that are transmitted to the controller, the safety logic block is configured to generate a safety output signal using the received input signals, the safety logic block is further configured to transmit the safety output signal to the controlled process independent of the control signals.

In another embodiment, a method of controlling a process includes receiving an input signal from the controlled process relating to a safety function of the process, transmitting the input signal to a process controller that is remote from the process and a safety logic block that is local to the process, and generating, by a first safety logic block, an output signal that controls the safety function using the input signal, the output signal transmitted to the process independent of any control signal transmitted to the controlled process from the controller.

In yet another embodiment, a control system includes a plurality of input devices, a plurality of output devices, and a programmable controller configured to execute a control program to control the output status of the plurality of output devices based on the input status of the plurality of input devices. The system also includes a programmable input output device communicatively coupled to the programmable controller. The programmable input output device includes a programmable safety logic block circuit configured to generate a safety output signal using the input status of at least one of the plurality of input devices in parallel with the control program such that the safety output signal is received by a respective output device prior to a corresponding control from the programmable controller is able to be received by the respective output device.

DETAILED DESCRIPTION OF THE INVENTION

The following detailed description illustrates embodiments of the invention by way of example and not by way of limitation. It is contemplated that the invention has general application to process controllers incorporating safety functions that facilitate reducing damage or injury during operation of a controlled machine or process.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
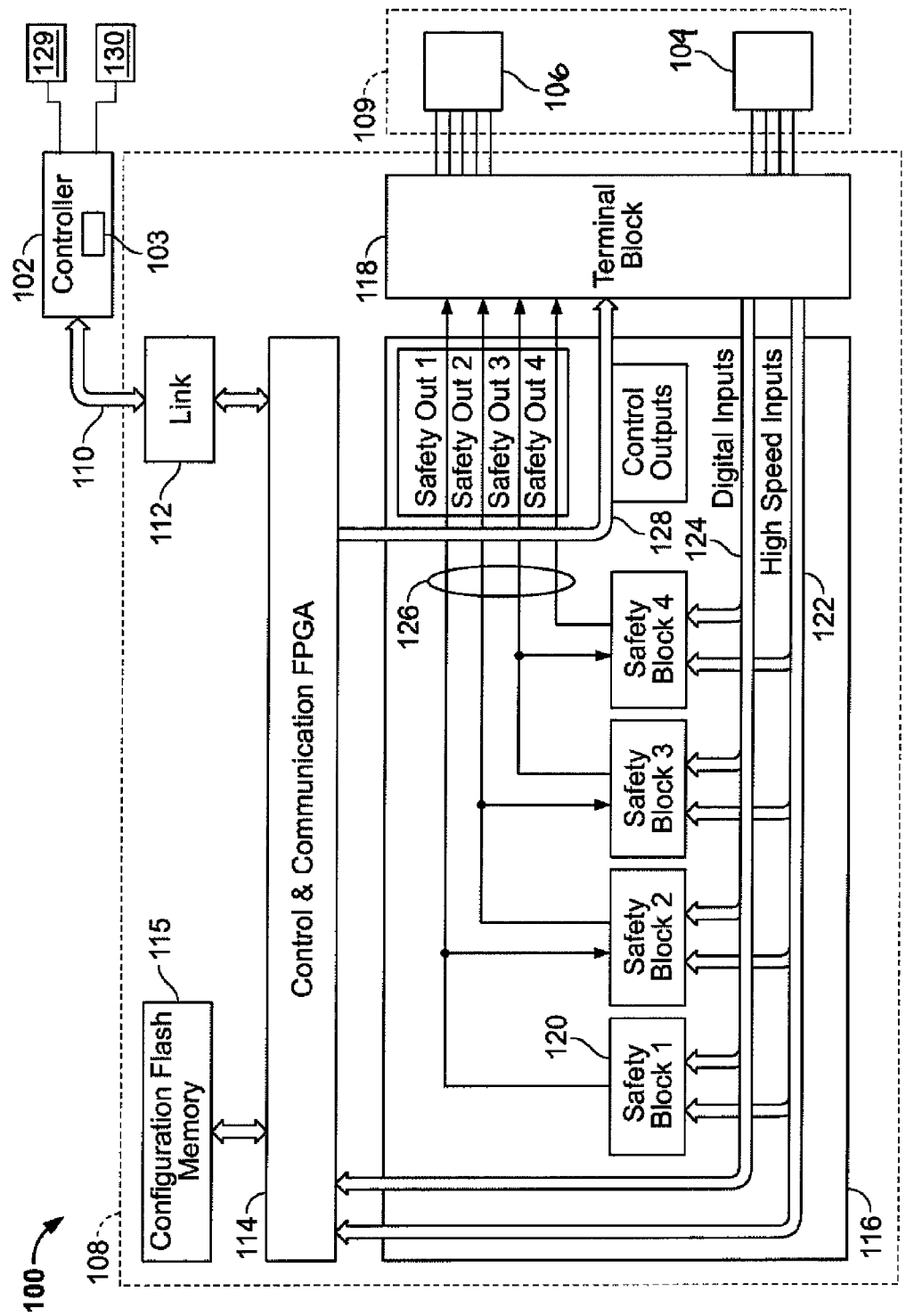
FIG. 1 is a schematic block diagram of a control system in accordance with an exemplary embodiment of the present invention.

FIG. 1 is a schematic block diagram of a control system 100 in accordance with an exemplary embodiment of the present invention. In the exemplary embodiment, system 100 includes a programmable controller 102, for example, but not limited to a programmable logic controller (PLC). In the exemplary embodiment, programmable controller 102 includes a processor 103 configured to execute a control program. Programmable controller 102 is communicatively coupled to a plurality of input devices 104 and a plurality of output devices 106 through a safe input output termination device 108. In an alternative embodiment, programmable controller 102 is communicatively coupled to other input devices 129 and output devices 130 in parallel with the safety input output termination device. Programmable controller 102 is configured to execute a control program to control the output status of the plurality of output devices 106, 130 based on the input status of the plurality of input devices 104, 129. Safe input output termination device 108 is communicatively coupled to programmable controller through a link 110, for example, but not limited to a fiber optic, a hard-wired, or a wireless link. Link 110 is controlled, in safe input output termination device 108 by a communication link circuit 112. Communications between controller 102 and safe input output termination device 108 are processed and formatted by a control and communication programmable device 114. In the exemplary embodiment, communication programmable device 114 comprises a field programmable gate array (FPGA). Communication programmable device 114 is also communicatively coupled to a configuration flash memory 115 configured to stored logic instructions for communication programmable device 114.

Safe input output termination device 108 further includes a programmable safety device 116 communicatively coupled between communication programmable device 114 and a terminal block 118. In the exemplary embodiment, signals transmitted between programmable controller 102, input devices 104, and output devices 106 are transmitted through programmable safety device 116. In the exemplary embodiment, programmable safety device 116 comprises a complex programmable logic device (CPLD). In other embodiments, other types of programmable logics devices may be used. In still other embodiments a microprocessor may be used. As used herein, programmable safety device 116 includes a set of simple programmable safety logic block circuits 120 having inputs and outputs that are connected together by an interconnection matrix. Programmable safety device 116 has two levels of programmability: each programmable safety logic block circuits 120 can be programmed, and the interconnections between the programmable safety logic block circuits 120 can be programmed. Programmable safety device 116 uses internal memory, EEPROM, SRAM, and/or Flash memory to hold the interconnect information.

Programmable safety logic block circuits 120 are configured to generate a safety output signal using the input status of at least one of the plurality of input devices 104. The input status is transmitted to programmable safety logic block circuit 120 from one or more of the plurality of input devices 104 through terminal block 118 and one of at least two input signal buses 122 and 124. The input status is also transmitted to communication programmable device 114 through input signal buses 122 and 124 that pass through the programmable safety device 116. In other embodiments the input signals may run in parallel to the programmable safety device 116. The safety output signal is transmitted to one or more of the plurality of output devices 106 through a respective safety output bus 126 and respective terminals of terminal block 118. A control output 128 bus is communicatively coupled between communication programmable device 114 and terminal block 118.

During operation, input devices 104 detect and/or monitor the input status of associated sensors and/or components. The input status is transmitted to programmable controller 102 through input signal buses 122 and 124 to communication programmable device 114. The input status signals are processed for transmission to programmable controller 102 through communication link circuit 112. In the exemplary embodiment, communication programmable device 114 packetizes the input status signals into network message packets for transmission through link 110 that is configured as a network bus.

Control signals are generated by controller 102 using the input status and a control program executing on processor 103. The generated control signals are transmitted to output devices 106 through link 110, communication link circuit 112, communication programmable device 114, and programmable safety device 116. In parallel with the processing of controller 102, programmable safety logic block circuit 120 receives the same input status signals transmitted to controller 102 through buses 122 and/or 124. Programmable safety logic block circuit 120 processes predetermined ones of the input status signals to generate safety output signals that are transmitted to output devices 106 through terminal block 118. Because the safety output signals are generated local to process 109 and output devices 106 and because programmable safety logic block circuit 120 comprises programmable logic rather than a program executing on a processor, the safety output signals are able to be received by output devices 106 faster than control signals generated by programmable controller 102. The shorter distance that the signals must transit and the speed of the simpler logic of programmable safety logic block circuit 120 make generating safety and emergency control functions in programmable safety logic block circuit 120 faster than generating the control signals in programmable controller 102.

For example, in an embodiment where process 109 comprises a metal punch machine, for personnel safety, the metal punch machine may be at least partially surrounded by a light curtain having input devices 104 positions to receive the light when the light curtain boundary is unbroken. Moving portions of the metal punch machine may be actuated by output devices 106 to control the operation of the metal punch machine in accordance with a program executing on programmable controller 102. A typical safety function of the program may be to emergency stop process 109 if input devices 104 associated with the light curtain detect that the light curtain has been broken, potentially by an operator's hand or arm. To ensure that process 109 is able to stop in sufficient time to prevent injury, a response time of process 109 to the determination that the light curtain has been broken should be as short as possible and at least shorter than the time it would take from the detection of the break in the light curtain to when a user's limb might enter the moving portions of process 109. Programmable safety logic block circuit 120 receives input status of the light curtain from input devices 104 associated with light detectors of the light curtain. Programmable safety logic block circuit 120 processes the input signals locally and generates safety output signals using relatively simple logic. The safety output signals are transmitted to respective output devices 106 to stop process 109 before the same input signals can make the round trip to programmable controller 102, the scan delay of programmable controller 102, and the return trip to the respective output devices 106.

Figure 2:
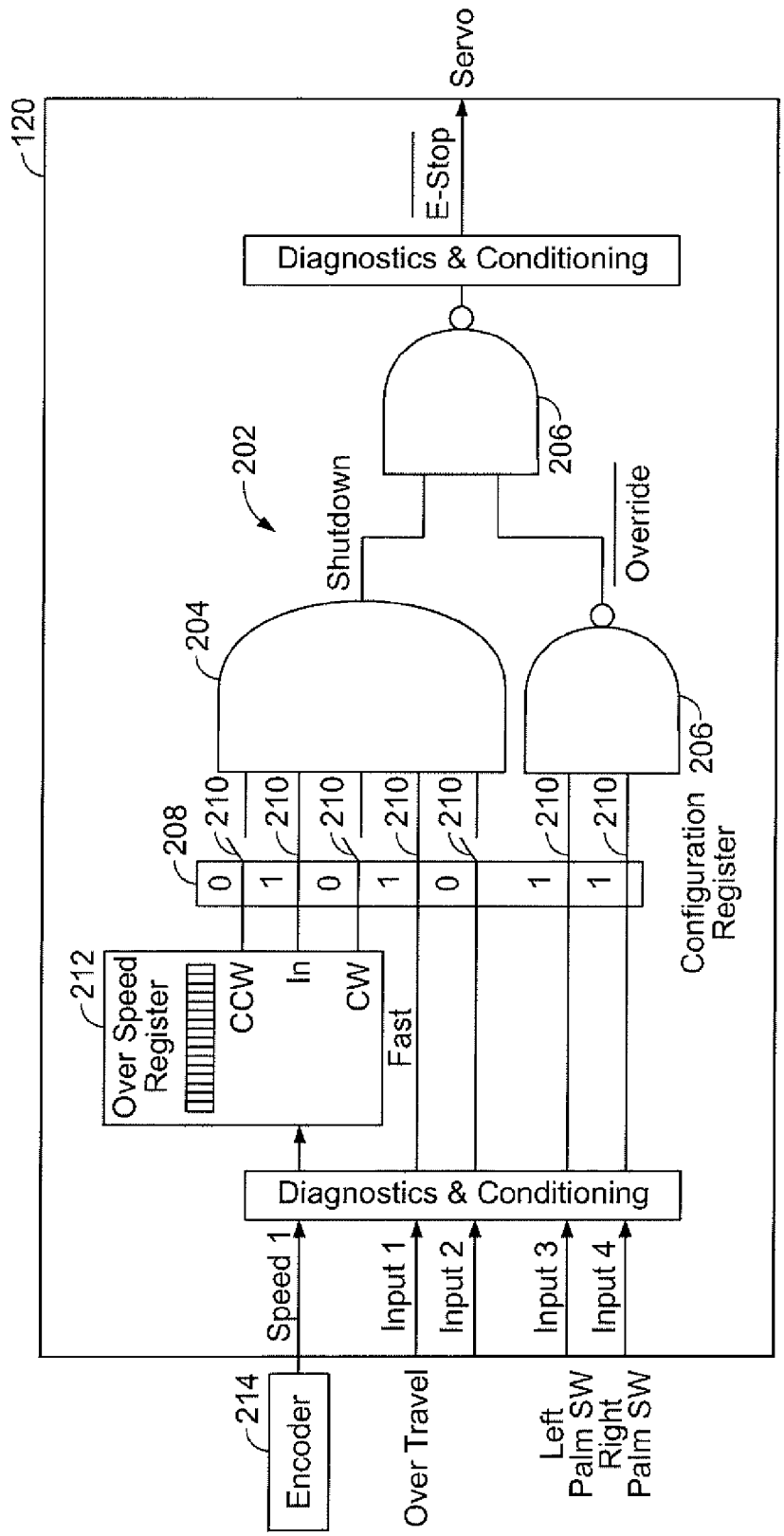
FIG. 2 is an expanded schematic block diagram of the programmable safety logic block circuit shown in FIG. 1.

FIG. 2 is an expanded schematic block diagram of programmable safety logic block circuit 120 (shown in FIG. 1). In the exemplary embodiment, includes programmable logic 202 that defines the operation of programmable safety logic block circuit 120. Programmable logic 202 includes standard logic implementations, for example, but not limited to an AND gate 204 and a NAND gate 206. Programmable logic 202 also includes a switch register 208 wherein each switch 210 may be expressed as a logical zero or a logical one. Programmable logic 202 also includes a decoder 212 for signals from a position encoder 214 associated with process 109. A plurality of precompiled safety certifiable logic blocks 202 are available to be programmed in safety block 120. Logic blocks utilize for example, a cyclic redundancy code (CRC) to verify the contents of the logic block were not changed during the transmission and storage to the programmable safety logic block 120. The contents of switch register 208 are separately programmable and is also certified using a cyclic redundancy code (CRC) to verify the contents of switch register 208 is not changed during a programming procedure.

Safe input output termination device 108 provides for local safety functions to be incorporated in control system 100, without having to qualify the entire control system 100 for safety operation. Safe input output termination device 108 also eliminates the need for a second independent safety control system to implement the safety functions. Safe input output termination device 108 provides a downloadable and configurable safety function, or functions, located local to process 109. During operation control system 100 operates normally unless an undesirable condition exists. Upon identification of an undesirable state, safe input output termination device 108 generates a safe output signal that executes a safety function in process 109. The execution of the safety function occurs independently from the commands of controller 102. Safe input output termination device 108 hardware and downloadable logic are certified for safety operation. Safe input output termination device 108 permits a user to implement local safety functions while utilizing input/output devices that are remote from control system 100. Safe input output termination device 108 eliminates the need for a separate safety system, or for having to qualify the entire safety system for safety operation.

Safe input output termination device 108 is also configured to implement a "Permissive Output." During normal operation a permissive output receives commands from a logic solver and executes those commands. If safe input output termination device 108 detects an undesirable state, on the inputs, the permissive output will be driven to the safe state. The execution of the safety function occurs independently from control outputs 128. During a system startup, the output safe state is programmable (i.e. energized or de-energized) and safe input output termination device 108 powers up in the safe state. Safe input output termination device 108 is also configured to only be modified in a program mode.

Safe input output termination device 108 provides a safety monitoring function in the same enclosure as the input output circuitry and diversity between control and safety functions that facilitates limiting the opportunity of common mode failures from preventing the operation of a safety function. The response time of a safety function is relatively faster than a response time of the control function. Because the safety logic is local, the system does not have to wait for the logic solver to read the inputs, process the logic, and then send the output commands.

In an alternative embodiment, a control system includes a plurality of input devices including motion (speed) inputs, a plurality of output devices including motion outputs (motors), and a programmable controller configured to execute a control program to control the output status of the plurality of output devices based on the input status of the plurality of input devices. The system also includes a programmable input output device communicatively coupled to the programmable controller. The programmable input output device includes a programmable safety logic block circuit configured to generate a safety output signal using the input status of at least one of the plurality of input devices and the speed of at least one of the plurality of motion devices in parallel with the control program such that the safety output signal is received by a respective output device if the input speed of a device exceeds a configurable set point. For example if a robot cell safety door is open and the robot is traveling faster than the configured safety speed, a robot emergency stop signal is transmitted.

In another alternative embodiment, link 110 and communication link circuit 112 are replaced with a back plane connector and driver circuitry (both not shown in FIG. 1) to form a safety module. Replacement and/or maintenance to the safety module does not require certification of the entire system and facilitates eliminating the time delay due to scan speed.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. As used herein, the terms "software" and "firmware" are interchangeable, and include any computer program stored in memory for execution by processor 103, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is a means to perform a process safety function within an input output module, while providing process inputs and outputs to a process control system without having to utilize a second control system, or certify the entire control system for safe operation. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system for controlling a process provides a cost-effective and reliable means of executing a safety function independently from control commands of a process controller. More specifically, the methods and systems described herein facilitate executing a safety function when an undesirable process condition is identified. In addition, the above-described methods and systems facilitate implementing a "Permissive Output" that during normal operation receives commands from the process controller and executes the commands. When an undesirable state on the inputs is detected, the permissive output is driven to a predetermined safe state. As a result, the methods and systems described herein facilitate controlling a process in a cost-effective and reliable manner.

While the disclosure has been described in terms of various specific embodiments, it will be recognized that the disclosure can be practiced with modification within the spirit and scope of the claims.

What is claimed is:

1. A control device comprising:
   an input section configured to receive input signals from a controlled process;
   a controller connected communicatively coupled to the input section and configured to receive the input signal and in response generate a control signal using the input signals;
   an input output termination device coupled to the input section and the controller, the input output termination device having a safety device, the safety device comprising:
   at least one safety logic block;

a terminal block having at least two communication paths;

a safety output section communicatively coupled to the at least one safety logic block, the safety output section configured to transmit a safety output signal to the controlled process; and a control output section communicatively coupled to the controller, the control output section configured to transmit control signals from the controller to the controlled process;

wherein the input signal from the controller process is bifurcated in the terminal block to a first path signal and a second path signal;

wherein the at least one safety logic block receives the first path signal and in response generates a safety output signal, and wherein the second path signal is received by the controller in parallel with the first path signal, the second path signal bypassing the safety device;

wherein the at least one safety logic block is configured to transmit a safety output signal to the controlled process independent of the control signals that are transmitted from the controller to the controlled processes;

wherein the at least one safety logic block comprises precompiled safety certifiable logic; and wherein the at least one safety logic block comprises a plurality of safety logic blocks, wherein an output of a first of the plurality of safety logic blocks is coupled to an input of a second of the plurality of safety logic blocks.

2. A control device in accordance with claim 1 wherein the safety output signal corresponds to the precompiled safety certifiable logic and wherein the safety output signal arrives at the controlled process prior to a control signal corresponding to the precompiled safety certifiable logic.

3. A control device in accordance with claim 2 wherein the precompiled safety certifiable logic comprises at least one of a machine emergency stop and a process shutdown.

4. A control device in accordance with claim 1 wherein said safety logic block comprises a programmable logic device.

5. A control device in accordance with claim 4 wherein said safety logic block comprises a complex programmable logic device.

6. A control device in accordance with claim 4 wherein said precompiled safety certifiable logic is stored within the programmable logic device, and said precompiled safety certifiable logic is safety certifiable to verify that contents of the programmable logic device were not changed during the transmission and storage to the safety logic block.

7. A control device in accordance with claim 6 wherein safety certification of the precompiled safety certifiable logic comprises use of a cyclic redundancy code.

8. A control device in accordance with claim 1 wherein said safety logic block is mounted physically remotely from the controller.

9. A method of controlling a process, said method comprising:

receiving an input signal from the controlled process relating to a safety function of the process;

transmitting the input signal to a process controller that is remote from the process;

simultaneously transmitting the input signal to an input output termination device which is coupled to the process controller and local to the process, and comprises at least one safety logic block and a terminal block having at least two communication paths;

bifurcating the input signal using the terminal block into a first signal path and a second signal path process controller;

receiving the first signal path to the at least one safety logic block, and receiving the second signal path by the process controller in parallel;

generating, by a first safety logic block, an output signal that controls the safety function using the input signal; and transmitting the output signal to the controlled process independent of any control signal transmitted to the controlled process from the process controller;

wherein the at least one safety logic block comprises precompiled safety certifiable logic; and wherein said at least one safety logic block comprises a plurality of safety logic blocks in a programmable logic device, said method further comprising receiving by a second safety logic block, the output signal generated by the first safety logic block, said second safety logic block generating a second output signal that controls the safety function using the input signal and the second output signal.

10. A method in accordance with claim 9 wherein the input signal is processed in the process controller in parallel with the at least one of the plurality of safety logic blocks.

11. A method in accordance with claim 9 further comprising generating, in the controller, a control signal that controls the safety function using the input signal wherein the output signal generated by said first safety logic block arrives at the process before control signal transmitted to the controlled process from the controller.

* * * * *